(12) United States Patent
Mori et al.

(10) Patent No.: US 6,338,764 B1
(45) Date of Patent: Jan. 15, 2002

(54) HYDROGEN-ABSORBING ALLOY AND HYDROGEN-ABSORBING ALLOY ELECTRODE

(75) Inventors: Toshihiro Mori, Okazaki; Hideki Iba, Toyota, both of (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/301,458

(22) Filed: Apr. 29, 1999

(30) Foreign Application Priority Data

Apr. 30, 1998 (JP) .......................................... 10-120638

(51) Int. Cl.$^7$ .......................... C22C 27/02; C22C 14/00
(52) U.S. Cl. ...................... 148/442; 148/421; 148/422; 420/900; 420/417; 420/420; 420/424
(58) Field of Search ................................ 148/442, 421, 148/422; 420/900, 417, 420, 424; 429/218, 223, 59; 423/644

(56) References Cited

U.S. PATENT DOCUMENTS

| | | | |
|---|---|---|---|
| 4,111,689 A | | 9/1978 | Liu |
| 4,278,466 A | | 6/1981 | de Pous |
| 4,283,226 A | | 8/1981 | van Mal et al. |
| 5,501,917 A | * | 3/1996 | Hong .......................... 429/101 |
| 5,541,017 A | | 7/1996 | Hong et al. |
| 5,591,394 A | | 1/1997 | Lee et al. |
| 5,738,736 A | * | 4/1998 | Tsuji et al. .................. 148/421 |
| 6,048,644 A | | 4/2000 | Tsuji et al. |

FOREIGN PATENT DOCUMENTS

| | | |
|---|---|---|
| EP | 11602 A1 | 5/1980 |
| EP | 0 161 075 | 11/1985 |
| EP | 0 197 680 A2 | 10/1986 |
| EP | 0 413 029 A1 | 2/1991 |
| FR | 2331623 | 6/1997 |
| JP | 2-10659 A1 | 1/1990 |
| JP | 04-337045 | 11/1992 |
| JP | 6-93366 A | 4/1994 |
| JP | 6-228699 | 8/1994 |
| JP | 7-268514 | 10/1995 |
| JP | 9-53135 | 2/1997 |
| JP | 9-53136 | 2/1997 |
| JP | 9-53137 | 2/1997 |
| WO | WO91/08167 | 6/1991 |

* cited by examiner

*Primary Examiner*—Sikyin Ip
(74) *Attorney, Agent, or Firm*—Burns, Doane, Swecker & Mathis, LLP

(57) ABSTRACT

To provide a hydrogen absorbing alloy having a BCC (body-centered cubic structure) as a crystal structure, and particularly a hydrogen-absorbing alloy for a nickel-hydride cell having excellent discharge capacity and durability (cycle characteristics), said hydrogen-absorbing alloy having a composition expressed by the general formula $Ti(100-a-b-c-d)Cr_aV_bNi_cX_d$, where X is at least one member selected from the group consisting of Y (yttrium), lanthanoids, Pd and Pt, and each of a, b, c and d is represented, in terms of at %, by the relations $8 \leq a \leq 50$, $30 < b \leq 60$, $5 \leq c \leq 15$, $2 \leq d \leq 10$ and $40 \leq a+b+c+d \leq 90$, wherein the crystal structure of a principal phase is a body-centered cubic structure, and further, the alloy contains at least one of Mo and W in place of V and at least one member selected from the group consisting of Y (yttrium), lanthanoids, Pd and Pt, and its crystal structure is converted to the body-centered cubic structure by heat-treatment.

1 Claim, 1 Drawing Sheet

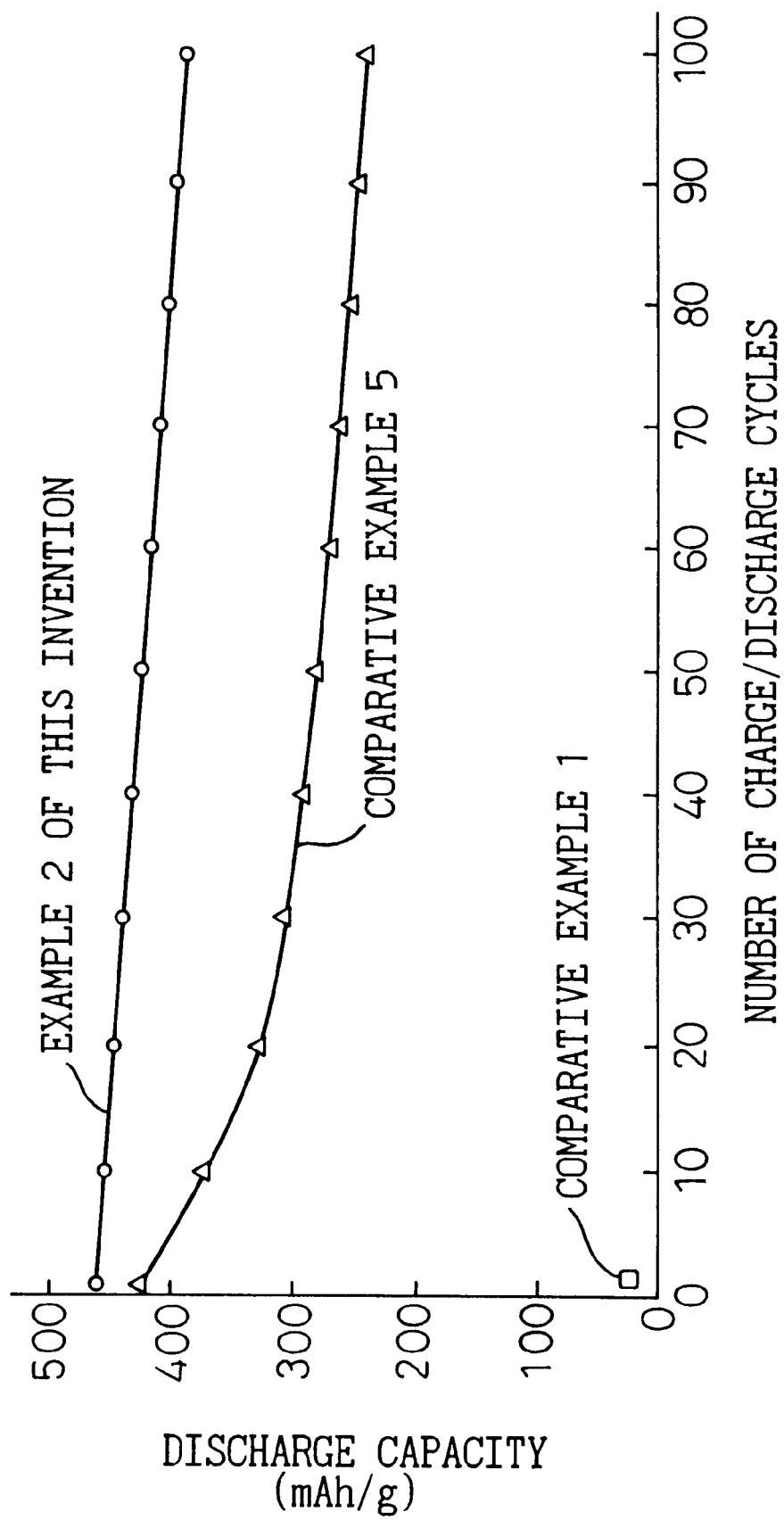

HYDROGEN-ABSORBING ALLOY AND HYDROGEN-ABSORBING ALLOY ELECTRODE

BACKGROUND OF THE INVENTION

1. Field of the Invention

This invention relates to a hydrogen-absorbing alloy having a BCC structure (body-centered cubic structure) as a crystal structure and, more particularly, to a hydrogen-absorbing alloy for a nickel-hydride cell having an excellent discharge capacity and excellent durability (cycle characteristics).

2. Description of the Prior Art

A hydrogen-absorbing alloy can absorb and store a volume of hydrogen gas more than about 1,000 times the volume of the alloy itself as means for storing and transporting hydrogen, and its density is equal to, or greater than, that of liquid or solid hydrogen. It has long been known that metals and alloys having a body-centered structure (hereinafter called the "BCC"), such as V, Nb, Ta, TiVMn system and TiVCr system alloys absorb and store greater amounts of hydrogen than $AB_5$ type alloys such as $LaNi_5$ and $AB_2$ type alloys such as $TiMn_2$ that have been already put into practical application. This is because the number of hydrogen absorbing sites in the crystal lattice of the BCC structure is large, and the hydrogen-absorbing capacity according to calculation is as great as H/M=2.0 (about 4.0 wt % in alloys of Ti or V having an atomic weight of about 50).

Though hydrogen-absorbing alloys have been used for cell electrodes in this field, the number of alloys having a body-centered cubic structure (BCC) is small, and Laves phase alloys of the $AB_2$ type such as misch metal have been mainly disclosed.

Japanese Unexamined Patent Publication (Kokai) No. 6-228699 discloses a hydrogen-absorbing alloy for an electrode of an alkali secondary cell which is expressed by the formula TixVyNiz and the composition range of which falls within the range encompassed by $Ti_5V_{90}Ni_5$, $Ti_5V_{75}Ni_{20}$, $Ti_{30}V_{50}Ni_{20}$ and $Ti_{30}V_{65}Ni_5$. Further, Japanese Unexamined Patent Publication (Kokai) No. 7-268514 discloses a hydrogen-absorbing alloy, and a hydrogen-absorbing alloy electrode, wherein a phase comprising the $AB_2$ type Laves alloy phase, as the principal phase, exists while it forms a three-dimensional stitch skeletal structure in the base phase comprising a Ti-V type solid solution alloy, and Japanese Unexamined Patent Publication (Kokai) No. 9-49046 discloses a hydrogen-absorbing alloy, and an electrode, expressed by the general formula TixVyMzNi1-x-y-z (where M is at least one element selected from the group consisting of Cr, Mo and W, and $0.2 \leq x \leq 0.4$, $0.3 \leq y < 0.7$, $0.1 \leq z \leq 0.3$ and $0.6 \leq x+y+z \leq 0.95$), and having a body-centered cubic structure. Japanese Unexamined Patent Publication (Kokai) No. 9-53135 describes a hydrogen-absorbing alloy, and an electrode, expressed by the general formula TixVyNi1-x-y-z (where M is at least one kind of element selected from the group consisting of Co, Fe, Cu and Ag, and $0.2 \leq x \leq 0.4$, $0.3 \leq y < 0.7$, $0.1 \leq z \leq 0.3$ and $0.6 \leq x+y+z \leq 0.95$) and having a body-centered cubic structure. Furthermore, Japanese Unexamined Patent Publication (Kokai) No. 9-53136 describes a hydrogen-absorbing alloy, and an electrode, expressed by the general formula TixVyMzNi1-x-y-z (where M is at least one kind of the element selected from the group consisting of Al, Mn and Zn, $0.2 \leq x \leq 0.4$, $0.3 \leq y < 0.7$, $0.1 \leq z \leq 0.3$ and $0.6 \leq x+y+z \leq 0.95$), and having a body-centered cubic structure.

Further, Japanese Unexamined Patent Publication (Kokai) No.9-53137 describes a hydrogen-absorbing alloy, and an electrode, expressed by the general formula TixVyMzNi1-x-y-z (where M is at least one kind of element selected from the group consisting of Zr and Hf, $0.2 \leq x \leq 0.4$, $0.3 \leq y < 0.7$, $0.1 \leq z \leq 0.3$ and $0.6 \leq x+y+z \leq 0.95$), and having a body-centered cubic structure.

However, all these BCC alloys contain large amounts of V and their durabilities (cycle characteristics) are not sufficient.

SUMMARY OF THE INVENTION

In order to convert the Ti—V—Cr type alloy, as one of the conventional BCC type hydrogen-absorbing alloys, to a quaternary or quinary alloy having a periodical structure by substituting V in the Ti—V—Cr alloy with other element and controlling the lattice constant, the present invention aims at providing a hydrogen-absorbing alloy, and an electrode, that can be used for cells having excellent cycle characteristics.

Another object of the present invention is to make it possible to produce an alloy, which is advantageous from the aspect of the production cost and has excellent hydrogen absorption and desorption characteristics, by heat-treatment, and to provide a hydrogen-absorbing alloy, and an electrode, that can be applied on the industrial scale to Ni-MH (Metallic hydride) cells.

Another object of the present invention is to provide an alloy for cells, which has a periodical structure by a spinodal decomposition and can be produced at a low cost on the industrial scale, by using the novel BCC alloy and heat-treatment described above through an optimum production process.

The gist of the present invention will be described as follows.

(1) A hydrogen-absorbing alloy comprises a composition expressed by the general formula:

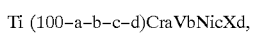

Ti (100-a-b-c-d)CraVbNicXd, where X is at least one member selected from the group consisting of Y (yttrium), lanthanoids, Pd and Pt, each of a, b, c and d is represented, in terms of atomic %, by the relations $8 \leq a \leq 50$, $30 < b \leq 60$, $5 \leq c \leq 15$, $2 \leq d \leq 10$ and $40 \leq a+b+c+d \leq 90$;

and a crystal structure of a principal phase which is a body-centered cubic structure.

(2) A hydrogen-absorbing alloy comprises a composition expressed by the general formula:

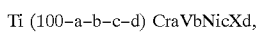

Ti (100-a-b-c-d) CraVbNicXd, where X is at least one member selected from the group consisting of Y (yttrium), lanthanoids, Pd and Pt and each of a, b, c and d is represented, in terms of atomic %, by the relations $8 \leq a \leq 50$, $0 < b \leq 30$, $5 \leq c \leq 15$, $2 \leq d \leq 10$ and $40 \leq a+b+c+d \leq 90$;

and a crystal structure of a principal phase which is converted to a body-centered cubic structure by heat-treatment.

(3) A hydrogen-absorbing alloy comprises a composition expressed by the general formula:

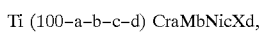

Ti (100-a-b-c-d) CraMbNicXd, where M is at least one of Mo and W, X is at least one member selected from the group consisting of Y (yttrium), lanthanoids, Pd and Pt, and each of a, b, c and d is expressed, in terms of atomic %, by the relations $8 \leq a \leq 50$, $30 < b \leq 60$, $5 \leq c \leq 15$, $2 \leq d \leq 10$ and $40 \leq a+b+c+d \leq 90$;

and a crystal structure of a principal phase which is converted to a body-centered cubic structure by heat-treatment.

(4) A hydrogen-absorbing alloy having the composition according to any of above items 1 through 3, wherein the principal phase exists within the range where a body-centered cubic structure appears and a spinodal decomposition occurs, exclusive of a C14 single-phase region, where C14 is a typical structure of a Laves phase and $MgZn_2$ type crystal structure; and said principal phase has a regular periodical structure and its apparent lattice constant is from 0.2950 nm to 0.3150 nm.

(5) A hydrogen-absorbing alloy according to item (2) or (3), wherein heat-treatment comprises solution treatment conducted for 1 min to 100 hr at a temperature range of from 700 to 1500° C., and one or both treatments selected from quenching and aging of from 350 to 1200° C. after solution treatment.

(6) A cell electrode comprising said hydrogen-absorbing alloy according to any one of items (1) through (4).

(7) A cell electrode according to item (6), wherein said cell electrode has excellent cell characteristics in the maximum discharge capacity and the capacity retaining ratio after 100 charge/discharge cycles.

(8) A cell electrode according to item (7), wherein the maximum discharge capacity is 375 to 465 mAh/g and the capacity retaining ratio after 100 charge/discharge cycles is 80 to 95%.

BRIEF DESCRIPTION OF THE DRAWING

FIG. 1 is a diagram showing the relationship between the number of charge/discharge cycles and the discharge capacity.

DETAILED DESCRIPTION OF THE PREFERRED EMBODIMENT

The present invention uses a Ti—Cr—V type alloy as the basis and improves the characteristics of a cell electrode. In other words, elution to an electrolyte is prevented as much as possible by V, and cycle characteristics, etc., are improved by imparting the elution resistance. Further, the present invention uses the BCC type structure as the principal phase and imparts the periodical structure by the spinodal decomposition. Therefore, Ni as the fourth element and Y, lanthanoids, Pd, Pt, etc., as the fifth element are added to the TiCrV alloy or TiCr(Mo,W) alloy having a body-centered cubic structure having a high capacity so that, when the alloy is used as an alloy for the electrode of nickel-hydride cells, discharge capacity and durability (cycle characteristics) can be improved.

The growth of the modulated metallic structure due to the spinodal decomposition in the present alloy can be divided into a spinodal decomposition stage, at which a concentration amplitude is increased from a concentration fluctuation of the initial stage, and a wavelength increasing stage at which the wavelength of the modulated structure formed by the former stage is increased. In the Ti—Cr—V system and in the Ti—Mn—V system, the reaction in the spinodal decomposition stage is extremely fast. This reaction finishes at the time of casting and solidification and quenching after heat-treatment, for example, and forms the modulated structure. The present invention makes it possible to control the hydrogen absorption quantity, the desorption characteristics and particularly, the plateau flatness, by controlling the increase of the concentration wavelength after the decomposition has already finished.

The first invention improves the cell characteristics by decreasing V while keeping the alloy ratio within the range of the body-centered cubic structure in the Ti—Cr—V system phase diagram and adds Ni so as to achieve a high capacity and a catalytic operation. The addition amount of Ni for remarkably exhibiting this effect is from 5 to 15% and preferably from 10 to 15%. Further, at least one member selected from the group consisting of Y, lanthanoids, Pd and Pt is added, preferably in a amount of 2 to 10%, so as to improve the charge and discharge characteristics, particularly the cycle characteristics of the negative electrode, at the time of discharge at a high efficiency. From the aspect of the improvement in durability, these elements form stable oxides and contribute to the improvement of durability. At the same time, because these elements have the catalytic operation for dissociating the hydrogen molecules into the atoms, they can enhance the reaction rate with hydrogen when they are used as the addition elements of the hydrogen-absorbing alloy of the present invention. Incidentally, if the addition amounts of these elements are outside the range stipulated in the scope of claim, the body-centered cubic structure cannot be obtained, so that the hydrogen absorption quantity decreases and the cell capacity deteriorates.

The second invention further reduces the V content, basically keeps other alloy components at the same level as the level of the first invention, and achieves the periodical structure by heat-treatment. This heat-treatment exhibits the following effect. Namely, the lattice strain occurring in the interface of the two phases changes the distribution state of the hydrogenation strain resulting from hydrogenation, as described above. Particularly in the alloys having the BCC structure such as the alloy of the present invention, the strain brought forth by hydrogenation exerts great influences on the pressure difference (hysteresis) between hydrogen absorption and desorption. Because such an initial strain can be controlled by the heat-treatment in the alloys having a fine structure as in the alloy of the present invention, an optimum strain distribution with a small hysteresis can be generated.

In the present invention, the effect of the solution treatment can hardly be obtained if the temperature is less than 700° C. and this effect tends to get into saturation if the temperature exceeds 1,500° C. Therefore, the temperature is preferably within the range of 700 to 1,500° C. The effect of the solution treatment is not sufficient if the treatment time is less than one minute and this effect tends to get into saturation if the treatment time exceeds 100 hours. Therefore, the treatment time is preferably within the range of one minute to 100 hours. This solution treatment provides also the effect of the homogenization treatment.

A cooling treatment and/or an aging treatment at 350 to 1,200° C. may be carried out either alone or in combination as a post-treatment of this solution treatment and preferably, the cooling treatment is a quenching treatment. In some cases, the alloy is kept at a temperature lower than the solution heat-treatment temperature before the cooling treatment. When the aging treatment is not conducted, the solution treatment is synonymous with the homogenization treatment.

The third invention adds Mo and W as the elements which make it easy to obtain the body-centered cubic structure by the heat-treatment instead of further decreasing the V content. Since this composition comprises Ti, Cr and Mo and/or W as the components, the cost becomes lower than the conventional hydrogen-absorbing alloys using V, etc. Because Mo and/or W is the component that replaces V, etc., the range of the solution treatment in the phase diagram can be expanded. In consequence, the phase separation takes place sufficiently, and an alloy having excellent hydrogen absorption and desorption characteristics in the two-phase state can be obtained. As to the addition amount, the alloy cannot be transformed to the BCC even when the heat-treatment is carried out under the addition of Mo and/or W of greater than 30 at %. If it exceeds 60 at %, the alloy is not practical because the hydrogen absorption quantity deteriorates. Therefore, the range stipulated in the scope of claim is adopted as the preferred range.

The fourth invention stipulates that the lattice constant (mean lattice constant of two phases) of the composition is not greater than the boundary line of 0.3150 nm, its apparent lattice constant (mean lattice constant of two phases) is not smaller than the boundary line of 0.2950 nm, and the composition is within the range in which the body-centered cubic structure appears with the exception of the C14 single-phase range. When these conditions are satisfied, the hydrogen absorption and desorption function of the hydrogen-absorbing alloy can be sufficiently exhibited, and an electrode for a high capacity cell can be formed.

As described above, the alloy of the present invention has excellent hydrogen absorption and desorption characteristics and can be used as an electrode for a hydride electrode having a high capacity and high durability, for an alkali cell.

Hereinafter, the present invention will be explained in further detail with reference to Examples thereof.

EXAMPLES

Hydrogen-absorbing alloys were prepared as examples of the present invention, and electrodes were produced so as to test cell characteristics. First, alloys having the compositions within the range of the present invention and those having the composition outside the range of the present invention, as Comparative Examples, were used as tabulated in Table 1. (Incidentally, the lattice constant of Example 2 was 0.3143 nm.)

TABLE 1

| No. | alloy composition (at %) | max. discharge capacity (mAh/g) | capacity retaining ratio after 100 cycles (%) |
|---|---|---|---|
| Inventive Ex. 1 | $Ti_{32}Cr_{15}V_{40}Ni_{10}La_3$ | 433 | 87 |
| Inventive Ex. 2 | $Ti_{30}Cr_{15}V_{40}Ni_{10}La_5$ | 462 | 85 |
| Inventive Ex. 3 | $Ti_{25}Cr_{15}V_{40}Ni_{10}La_{10}$ | 416 | 82 |
| Inventive Ex. 4 | $Ti_{36}Cr_{16}V_{40}Ni_{15}La_3$ | 407 | 86 |
| Inventive Ex. 5 | $Ti_{29}Cr_{13}V_{40}Ni_{45}La_3$ | 354 | 85 |
| Inventive Ex. 6 | $Ti_{32}Cr_{15}V_{40}Ni_{10}Ce_3$ | 431 | 87 |
| Inventive Ex. 7 | $Ti_{32}Cr_{15}V_{40}Ni_{10}Mm_3$ (Mm: misch metal) | 428 | 87 |
| Inventive Ex. 8 | $Ti_{37}Cr_{10}V_{40}Ni_{10}Pd_3$ | 378 | 89 |
| Inventive Ex. 9 | $Ti_{31}Cr_{14}V_{40}Ni_{10}Pt_5$ | 393 | 90 |
| Inventive Ex. 10 | $Ti_{53}Cr_{24}V_{10}Ni_{10}La_3$ | 419 | 94 |
| Inventive Ex. 11 | $Ti_{46}Cr_{21}V_{20}Ni_{10}La_3$ | 421 | 91 |
| Inventive Ex. 12 | $Ti_{39}Cr_{18}V_{30}Ni_{10}La_3$ | 427 | 90 |
| Inventive Ex. 13 | $Ti_{41}Cr_{38}Mo_6Ni_{10}La_5$ | 445 | 94 |
| Inventive Ex. 14 | $Ti_{43}Cr_{39}W_3Ni_{10}La_5$ | 458 | 92 |
| Comparative Ex. 1 | $Ti_{28}Cr_{32}V_{40}$ | 17 | — |
| Comparative Ex. 2 | $Ti_{25}Cr_{29}V_{36}Ni_{10}$ | 154 | — |
| Comparative Ex. 3 | $Ti_{43}Cr_{41}Mo_6Ni_{10}$ | 135 | — |
| Comparative Ex. 4 | $Ti_{25}Cr_{12}V_{40}Ni_{20}La_3$ | 181 | — |
| Comparative Ex. 5 | $Ti_{17}Cr_8V_{62}Ni_{10}La_3$ | 414 | 61 |

Note) Measurement of capacity retaining ratio was omitted for those alloys which had a maximum discharge capacity of not greater than 300 mAh/g.

Examples Nos. 1 to 9 of the present invention were within the range of the first invention. While the V content was kept a little high, at least one of lanthanoids, Pd and Pt was added, and the proportion of addition and the proportion of the Ni content were changed. Examples Nos. 10 to 12 of the invention kept the V content a little low, and Examples 13 and 14 did not use V at all and Mo and/or W was added instead.

All the samples of Examples of the present invention used an ingot of about 20 g molten by arc melting inside argon by using a water cooled copper hearth. The data of all the Examples of the present invention were the measurement data obtained by pulverizing an as-cast ingot in air, repeating four cycles an activation treatment by applying a vacuum, at 500° C., to $10^{-4}$ Torr and hydrogen pressurization at +50 atm, and then conducting a vacuum origin method stipulated for a pressure composition isothermal measurement method as a volumetric method (JIS H7201) to evaluate the hydrogen absorption quantity of each alloy and its absorption and desorption characteristics. A thin film was prepared, by ion milling from a bulk sample, for the observation of each sample by a transmission electron microscope.

Structural analysis of each alloy was made by using a transmission electron microscope and its accessory EDX (energy dispersive X-ray spectrometer). Further, a crystal structure model was prepared on the basis of the information obtained by the transmission electron microscope, and Riedveld analysis of the powder X-ray diffraction data was effected. The results of measurement of the alloy composition, the lattice constant of each alloy and its hydrogen absorption and desorption quantity revealed that, when the lattice constant mean value was less than 0.2950 nm, the hydrogen absorption and desorption quantity was low and, when the lattice constant mean value became greater than 0.2950 nm, the hydrogen absorption and desorption quantity increased, and reached the maximum near 0.3150 nm. When the lattice constant mean value increased thereafter, the hydrogen absorption and desorption quantity decreased drastically. It could be concluded from the results that, in order to obtain a hydrogen absorption and desorption quantity greater than a predetermined quantity, the mean value of the lattice constant of the two-phase in the nano-order that constituted the BCC phase was preferably within the range of 0.2950 nm to 0.3150 nm.

Next, an electrode was produced from each alloy of the Examples of the present invention, and the Comparative Examples, by conducting compression molding of alloy powder, and a Ni-hydride type cell of the prior art, which included a Ni positive electrode having a sufficient capacity and large amounts of electrolyte, was produced by using each electrode.

FIG. 1 shows the relationship between the number of charge and discharge cycles and the discharge capacity when charging at a low current and discharging were repeatedly executed in Example 2 of the present invention and in Comparative Examples 1 and 5. It could be appreciated from this result that in Example 2 of the present invention, the drop of the discharge capacity was small and the cycle characteristics could be remarkably improved.

In the same way, Table 1 completely tabulates the maximum discharge capacity and the cycle characteristics for all the alloys inclusive of the rest of Examples of the present invention.

It will be appreciated from the result tabulated in Table 1 that the maximum discharge capacity was within the range of 378 to 462 mAh/g in Examples of the present invention and the capacity retaining ratio after 100 cycles was 82 to 94%. Both of these values were superior to the values of Comparative Examples. Incidentally, the measurement of the capacity retaining ratio was omitted in this table for the alloys whose maximum discharge capacity was not greater than 300 mAh/g.

The present invention provides an alloy which has excellent hydrogen absorption and desorption performance and whose body-centered cubic structure, having a high capacity as a cell characteristic, depends on the addition of the fourth or fifth element. Therefore, this alloy can be used as a high efficiency electrode for nickel-hydride cells, and can be applied as the electrode of cells having excellent discharge capacities and durabilities (cycle characteristics).

What is claimed is:

1. A hydrogen-absorbing alloy comprises a composition expressed by the general formula:

$$Ti_{(100-a-b-c-d)} Cr_a V_b Ni_c X_d,$$

where X is at least one member selected from the group consisting of Y (yttrium), lanthanoids, Pd and Pt, each of a, b, c and d is represented, in terms of atomic %, by the relations $8 \leq a \leq 50$, $30 < b \leq 60$, $5 \leq c \leq 15$, $2 \leq d \leq 10$ and $40 \leq a+b+c+d \leq 90$;

and a crystal structure of a principal phase which is a body-centered cubic structure, wherein the principal phase exists within the range where a body-centered cubic structure is generated by a spinodal decomposition, exclusive of C14 single-phase region, where C14 is a crystal structure of a Laves phase and $MgZn_2$ hexagonal crystal structure; and said principal phase has a regular periodical structure and its empirical lattice constant is from 0.2950 nm to 0.3150 nm.

* * * * *